United States Patent
Pan et al.

(10) Patent No.: US 9,639,643 B2
(45) Date of Patent: May 2, 2017

(54) METHOD AND SYSTEM FOR GENERATING ELECTRIC LOAD MODELS

(71) Applicant: General Electric Company, Schenectady, NY (US)

(72) Inventors: Yan Pan, Niskayuna, NY (US); Sumit Bose, Niskayuna, NY (US); Wei Ren, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 512 days.

(21) Appl. No.: 14/297,748

(22) Filed: Jun. 6, 2014

(65) Prior Publication Data

US 2015/0356213 A1 Dec. 10, 2015

(51) Int. Cl.
*G06F 17/50* (2006.01)
*G01D 4/00* (2006.01)
(Continued)

(52) U.S. Cl.
CPC ......... *G06F 17/5036* (2013.01); *G01D 4/002* (2013.01); *G06Q 10/04* (2013.01); *G06F 2217/78* (2013.01); *G06Q 50/06* (2013.01); *Y02B 90/241* (2013.01); *Y02B 90/248* (2013.01); *Y04S 20/32* (2013.01); *Y04S 20/38* (2013.01); *Y04S 20/52* (2013.01)

(58) Field of Classification Search
USPC ........................................................ 703/2, 7
See application file for complete search history.

(56) References Cited

U.S. PATENT DOCUMENTS

| 7,233,843 B2 | 6/2007 | Budhraja et al. |
| 2011/0251732 A1 | 10/2011 | Schweitzer, III et al. |
| 2012/0053744 A1 | 3/2012 | Manson |

FOREIGN PATENT DOCUMENTS

| CN | 102377180 A | 3/2012 |
| CN | 102426623 A | 4/2012 |

(Continued)

OTHER PUBLICATIONS

Dong et al., "Effect of Uncertainties in Parameters of Load Model on Dynamic Stability Based on Probabilistic Collocation Method", Power Tech, 2007 IEEE Lausanne, Jul. 1-5, 2007, pp. 1100-1104, Lausanne.

(Continued)

*Primary Examiner* — Thai Phan
(74) *Attorney, Agent, or Firm* — Nitin N. Joshi

(57) ABSTRACT

A method for generating electric load models that includes receiving a plurality of measurements representative of input provided by a power source to electric loads is provided. The method includes generating a plurality of combination of model loads and assigning a contribution factor to each model load in each combination. The method further includes computing a match index for each combination for each measurement. The match index is computed by comparing a predicted output of each combination with an actual output generated by the electric loads for each input represented by each measurement. Furthermore, the method includes computing a first likelihood index for each combination based on the match index for each combination for the plurality of measurements. The method also includes computing a second likelihood index for each contribution factor in each combination based on the match index for each combination.

11 Claims, 6 Drawing Sheets

(51) Int. Cl.
*G06Q 10/04* (2012.01)
*G06Q 50/06* (2012.01)

(56) References Cited

FOREIGN PATENT DOCUMENTS

| | | |
|---|---|---|
| CN | 102842906 A | 12/2012 |
| CN | 102146812 A | 4/2014 |
| JP | 2004064969 A | 2/2004 |

OTHER PUBLICATIONS

Chen et al., "Probabilistic load models for simulating the impact of load management", Power & Energy Society General Meeting, 2009. PES '09. IEEE, Jul. 26-30, 2009, pp. 1-8, Calgary, AB.

| Run No | Run Combination | | | Fma | Fmb | Fmc | Fmd | PFs | P1c | P2c | Q1c | Q2c | Obj |
|---|---|---|---|---|---|---|---|---|---|---|---|---|---|
| 1 | 1 | 2 | 3 | 0.07 | 0.44 | 0.02 | 0.14 | 0.33 | 0.06 | 0.31 | -0.03 | 0.19 | 0.06704 |
| 2 | 1 | 2 | 5 | 0.00 | 0.44 | 0.29 | 0.14 | 0.39 | 0.00 | 0.00 | 2.00 | -1.00 | 0.02870 |
| 3 | 1 | 2 | 6 | 0.03 | 0.39 | 0.25 | 0.12 | 0.40 | 0.25 | 0.25 | -0.03 | 0.16 | 0.04405 |
| 4 | 1 | 2 | 7 | 0.03 | 0.43 | 0.31 | 0.09 | 0.53 | 0.48 | 0.28 | 0.43 | 0.15 | 0.02268 |
| 5 | 1 | 2 | 8 | 0.00 | 0.47 | 0.18 | 0.13 | 0.34 | 0.59 | 0.00 | 0.76 | -1.59 | 0.03552 |
| 6 | 1 | 2 | 10 | 0.05 | 0.45 | 0.30 | 0.07 | 0.33 | 0.00 | 1.00 | -0.17 | 1.17 | 0.00004 |
| 7 | 1 | 3 | 5 | 0.09 | 0.31 | 0.34 | 0.19 | 0.26 | 0.35 | 0.20 | 0.67 | 0.05 | 0.35526 |
| 8 | 1 | 3 | 6 | 0.00 | 0.30 | 0.58 | 0.00 | 0.07 | 0.00 | 0.00 | -1.00 | 2.00 | 0.31367 |
| 9 | 1 | 3 | 7 | 0.14 | 0.33 | 0.29 | 0.06 | 0.29 | 0.26 | 0.32 | -0.01 | 0.51 | 0.38326 |
| 10 | 1 | 3 | 8 | 0.22 | 0.32 | 0.00 | 0.18 | 0.31 | 0.00 | 0.00 | 2.00 | -2.00 | 0.40782 |

FIG. 5

METHOD AND SYSTEM FOR GENERATING ELECTRIC LOAD MODELS

BACKGROUND

The present invention relates generally to the field of electric power transmission and consumption, and more particularly, to a method and system for generating electric load models.

Electric power generation and consumption includes three broad stages, namely, generation, transmission, and consumption. Generation typically includes one or more power sources that generate electric power. Power sources include non-renewable sources such as fossil fuel based power plants as well as renewable sources such as wind/solar/tidal power plants. The power generated by these power sources is carried to their consumption points through a transmission network that includes transformers, power sub-stations, and power buses. The transmission networks are typically designed to efficiently transfer power from the power sources to consumption points. Consumption may occur through electric machines that may be used at factories or electric appliances that consumers may be using at their homes. Power networks may be designed to cater to different volumes of consumers. For example, some networks may be designed to handle power requirements of a local neighborhood whereas other networks may be designed to handle large cities.

Power system monitoring and control is of utmost importance to provide uninterrupted power supply to consumers. For a detailed view of possible sources of power loss, generation, transmission, and consumption sections of networks are monitored through various mechanisms. Monitoring on these three sections may be carried out either through actual readings obtained from desired sections of the network or through predictive analysis. Multiple systems have been made to predict outputs generated at the generation as well as transmission sections of power networks. Consumption prediction, however, is not always accurate owing to frequent changes in utilization patterns. Consumption prediction may still be manageable with small networks where the utilization patterns may be fairly predictable. However, in small networks, a small change in consumption by a single consumer may lead to a large change in utilization patterns thus making consumption prediction even more difficult. With larger power networks, however, owing to constant new additions of consumers or power consuming appliances, the problem of unpredictable utilization patterns is further complicated.

Many electric load modelling techniques have been devised to predict electric load behavior in power networks. Load modelling techniques may be divided in two major categories—static and dynamic. Current static as well as dynamic load modeling techniques are dependent on data collected during specific events such as blackouts when significant changes occur in input voltage and/or frequency. Existing static load models include algebraic equations that define a relationship between input provided by power sources and an output generated by the electric loads connected to the power sources. These relationships are static and hence do no factor dynamic changes to load conditions. Further, these static relationships also do not change according to varying utilization patterns that are generally observed in power networks.

Dynamic load models, on the other hand, capture time evolution of consumption of power by electric loads. Dynamic load modeling techniques include determining, through a plurality of iterations, a best-fit match of model loads for actual electric loads connected to the power source. However, most of the existing dynamic models are deterministic in nature. In deterministic dynamic load models, a unique load model is determined based on the collected data. Deterministic load models, while being capable of replicating the behavior of the electric network for a particular set of events, may not be useful to understand the effect of unexpected changes to the load consumption patterns and load conditions. This limitation in current models reduces their utility in many practical situations where new electrical loads are added to the network by consumers without prior intimation.

Hence, there is a need for a method and system that provides for a dynamic and probabilistic load model.

BRIEF DESCRIPTION

According to one embodiment of the present invention, a method for generating electric load models is provided. The method includes receiving a plurality of measurements representative of input provided by a power source to electric loads. The measurements are generated at different time instances. Further, the method includes generating a plurality of combination of model loads and assigning a contribution factor to each model load in each combination. The method further includes computing a match index for each combination for each measurement. The match index is computed by comparing a predicted output of each combination with an actual output generated by the electric loads for each input represented by each measurement. The predicted output for each combination is generated by providing input equivalent to each measurement. Furthermore, the method includes computing a first likelihood index for each combination based on the match index for each combination for the plurality of measurements. The method also includes computing a second likelihood index for each contribution factor in each combination based on the match index for each combination for the plurality of measurements.

According to another embodiment of the present invention, a system for generation of electric load models is provided. The system includes at least one input system configured to receive a plurality of measurements that are representative of input provided by a power source to a plurality of electrical loads at different time instances. The measurements are collected from a power bus that couples the power source with the electrical loads. The system further includes a processing system. The processing system is configured to generate a plurality of combination of model loads and assigning a contribution factor to each model load in each combination. The processing system is also configured to compute a match index for each combination for each measurement. The match index is computed by comparing a predicted output of each combination with an actual output generated by the plurality of electric loads for each input represented by each measurement. The predicted output for each combination, on the other hand, is generated by providing each combination with input equivalent to each measurement. Furthermore, the processing system is configured to compute a first likelihood index for each combination based on the match index for each combination for the plurality of measurements. The processing system is also configured to compute a second likelihood index for each contribution factor in each combination based on the match index for each combination for the plurality of measurements.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

FIG. 5 illustrates an exemplary output of the method of determining load models according to an embodiment of the invention.

DETAILED DESCRIPTION

Figure 1:
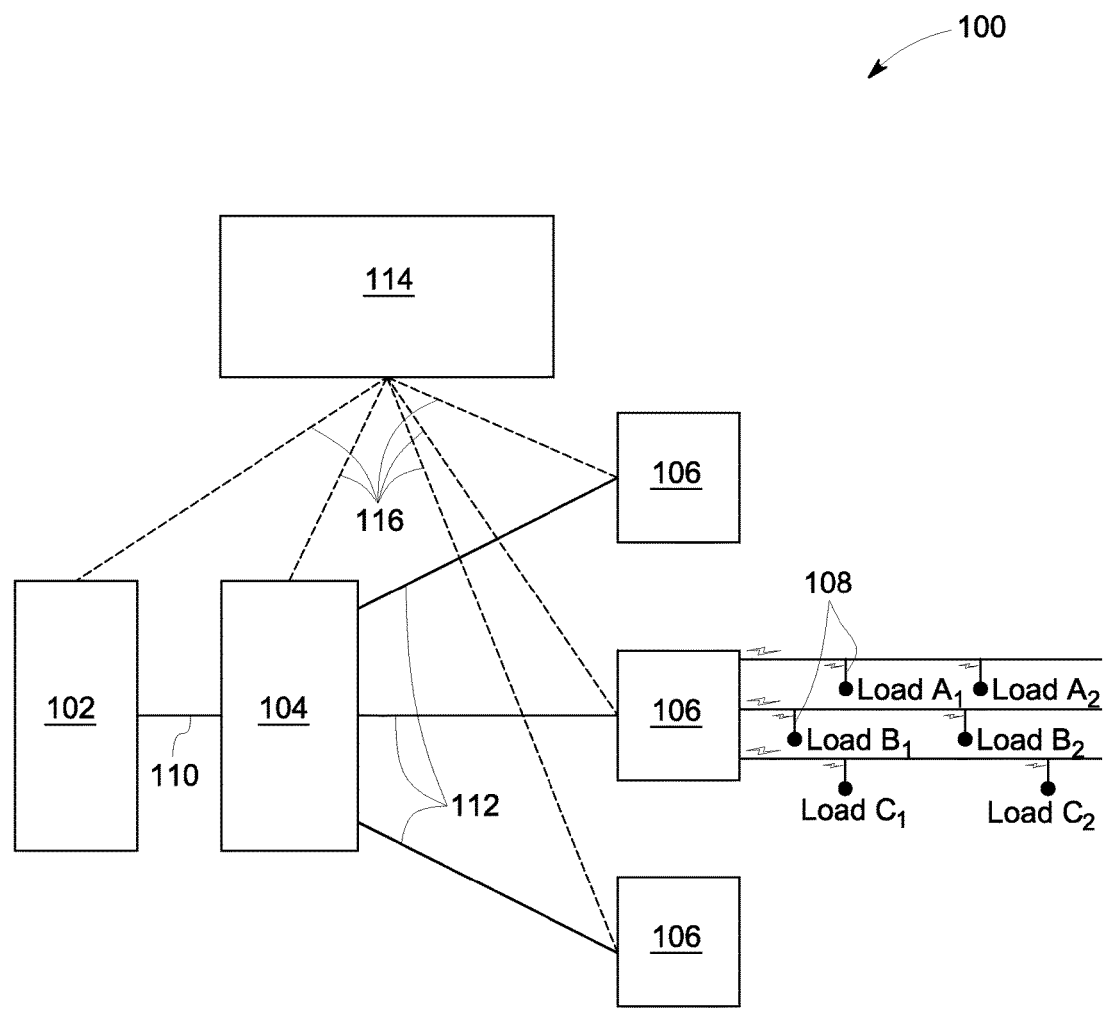
FIG. 1 is a diagrammatical illustration of a typical electric network.

Reference will be made below in detail to exemplary embodiments of the invention, examples of which are illustrated in the accompanying drawings. Wherever possible, the same reference numerals used throughout the drawings refer to the same or like parts.

Embodiments of the present invention provide for a method and system for determination of load models. Electric networks that provide electric power from a power source to a plurality of loads through multiple buses require timely monitoring. Monitoring of these networks is based on simulating the generation, transmission, and consumption sections of the network. Load modelling techniques are utilized to simulate the performance of electric loads connected to the power buses. Various types of electric loads such as electric appliances and electric machines may be coupled with the power buses and may utilize different magnitude of power depending on the multiple factors. Factors that influence power consumption of loads may include, but are not limited to, time of the day, weather conditions, and an increase in production demands of a factory. Electric load simulation requires that the simulated overall load condition of a network factors these variances and does not require major changes to be utilized at different time instances. The present methods and systems described hereinafter provide for a dynamic and probabilistic load model that can be utilized for network assessment at different time instances with minimal changes to the load model.

FIG. 1 illustrates an overall electric system 100 from generation to consumption. The electric system 100 includes a generating station 102, a transmission substation 104, local substations or distribution substations 106 and electric loads 108. Generating station 102 may comprise conventional power generation stations that consume fossil fuels such as coal, fuel oil, natural gas, and oil shale, as well as non-conventional stations such as hydropower generating stations, thermal power generating stations, wind power generating stations, or solar power generating stations, for example. The generating station 102 typically generates electricity at a generating station voltage. The generating station voltage is stepped up to a higher transmission level voltage by a generating station transformer (not shown) for more efficient transfer of the electricity.

The electricity at the transmission level voltage is transmitted to transmission substation 104 by primary transmission lines 110 that are configured to carry electricity long distances. At transmission substation 104, a reduction in voltage occurs for distribution to other points in the system through secondary transmission lines 112. Further voltage reductions for commercial and industrial or residential loads 108 may occur at distribution substation 106. The voltages may be further reduced by one or two more levels at distribution substation 106 or other local substations (not shown) receiving power from distribution substation 106 to supply the electricity to residential loads at lower voltages such as 120 V or 240 V.

A utility control center 114 is communicably coupled with the generating station 102, the transmission substation 104, and the distribution substations 106 through communication channels 116. The utility control center 114 receives data from these components and also provides control signals to these components. Electric loads 108 may communicate with their respective distribution substations 106 and thus, the utility control center 114 may also receive and transmit information to and from the loads 108.

To simulate the operation of the system 100, models are devised for the generating station 102, the transmission substation 104, the local substations or distribution substations 106 and electric loads 108. Load models are utilized to simulate expected power consumption at any point of time. Network models that help users simulate the entire operation of electric networks have been devised. Such models include models for the generating stations, transmission substations, and electric loads. One such network model, as defined by Western Electricity Coordinating Council (WECC) is described along with FIG. 2. Embodiments of the present technique detail a method and system for determining load models that can be utilized in the network models such as the ones illustrated in FIG. 2.

Figure 2:
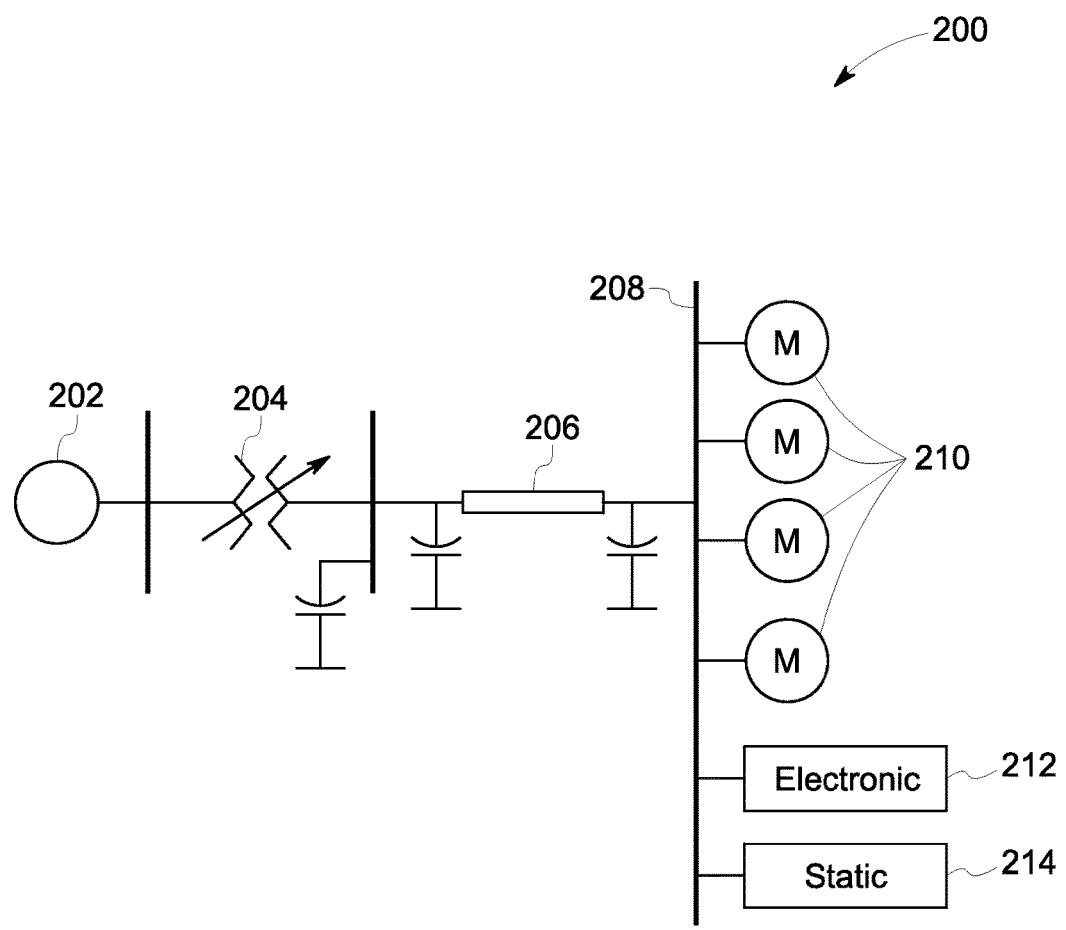
FIG. 2 illustrates an exemplary load model 200 defined by Western Electricity Coordinating Council.

FIG. 2 illustrates an exemplary load model 200 defined by Western Electricity Coordinating Council. The Western Electricity Coordinating Council is the regional entity responsible for coordinating and promoting bulk electric system reliability in the Western Interconnection of North America. A functional electric network or a load model, as prescribed by the WECC, includes a generating station, transmission substations, and connected electric loads. To enable power generation corporations and electric grid operators in electrical network analysis of networks such as the network/model 200 WECC developed models for transmission sub-stations, and distribution loads. The load model 200 includes a source 202 coupled to a plurality of transmission equipment. The transmission equipment includes a transformer 204, feeder line 206, and a power bus 208. In the load model 200, multiple electric model loads are coupled to the power bus 208.

Electric loads that are coupled to the power bus 208 include, but are not limited to, appliances, machines, electronic components, and the like. The electric model loads include motor model loads 210, electronic model load 212, and static model load 214. Multiple appliances and machines are represented in the form of motor model loads 210. For example, motor model loads 210 may represent constant-power loads (e.g., switching power supplies, induction motors or constant impedance loads, such as incandescent lighting and resistance heating (e.g., dryers, baseboard heaters, stoves, hot water heaters). Each component of the model 200 is described by a plurality of parameters. For example, the transformer 204 is described by parameters such as minimum low-side voltage, maximum low-side voltage, step of a tap in a tap-changing transformer, and the like. Parameters, such as motor loading factor, stator resistance, electronic load power factor, and inertia constant among others, are used to define the electric model loads 210, 212, and 214.

Values for each parameter for each component may be varied to create a repository of different variations in the components of the model 200. Different model load types may be defined based on the parameters that describe the electric model loads 210, 212, and 214 in the model 200. For example, by varying motor loading factor iteratively, multiple motor model variations for motor model load 210 may be defined. A combination of these variations of motor model loads may be selected to simulate the motor model loads 210 from the model 200. Further, for each combination, a contribution factor may also be selected for each motor model load 210 to accurately represent the coupled actual motor model loads. A combination of model loads is a mathematical representation of a relationship between input provided by the power source and all electric loads coupled to the power bus of the electric network. Each combination is further defined by a contribution factor associated with each model load in the combination. Contribution factor defines the contribution of a particular model load in defining all electric load coupled to the power bus 208.

The method and system described in forthcoming paragraphs may be used to select a combination of model loads and also select a contribution factor for each model load in the selected combination. The combination of model loads and their respective contribution factors may be utilized to recreate an actual electric network based on the model 200. This recreated network is utilized to study the electric network and observe the effect of sudden load changes to the electric network. Further, the model 200 with various combinations and contribution factors may be used to understand the effect of increment and/or decrement in electric load in the network.

Figure 3:
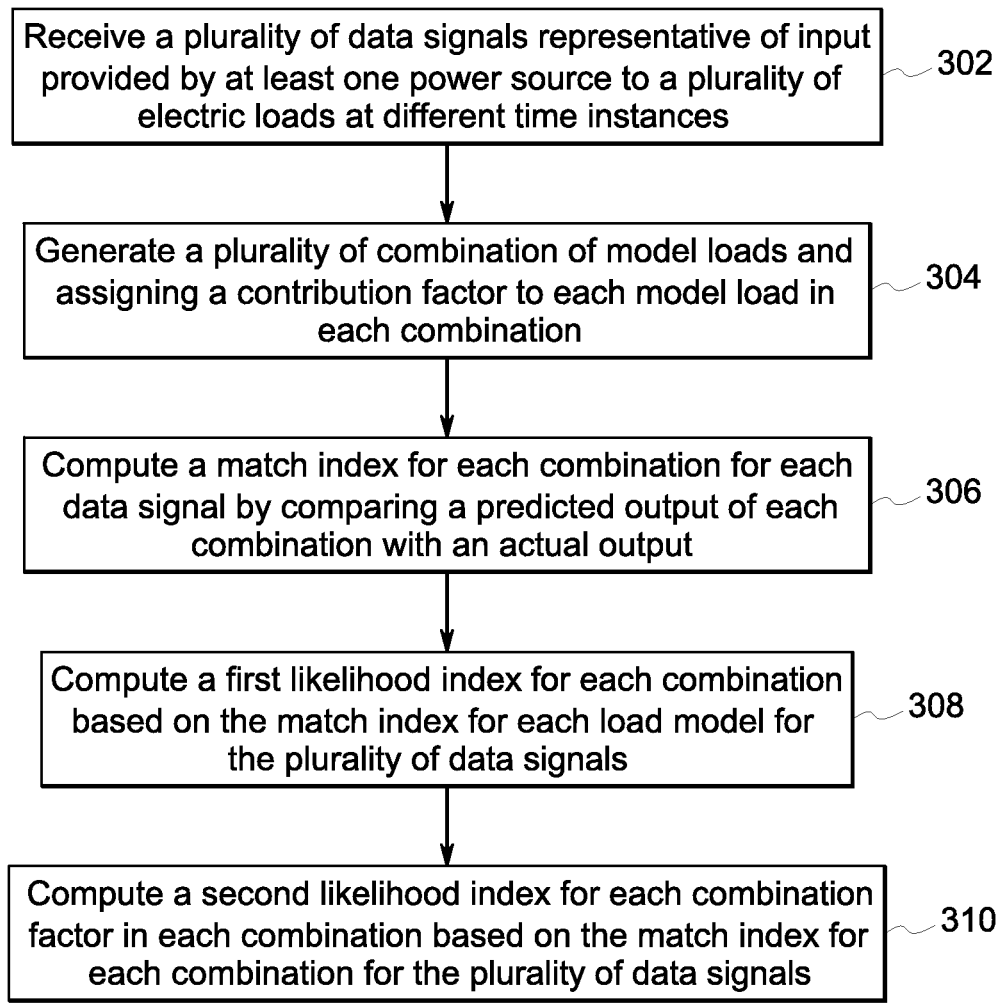
FIG. 3 illustrates a method for determination of load models, according to one embodiment of the present invention.

FIG. 3 illustrates a method for determination of a load model, according to one embodiment of the present invention. The method for determination of load models includes identifying one or more combinations of model loads and the contribution factor of each model load in the combinations. The identified combinations and contribution factors represent a plurality of loads coupled to the power bus based on data collected from the power bus at different time instances.

At step 302, a plurality of measurements are received. The plurality of measurements are representative of input provided by the power source to the electric loads. The measurements may include voltage (V) across the power bus, current (I) flowing through the power bus, AC frequency (F), real power (P) provided by the power source, and reactive power (Q) provided by the power source. The plurality of measurements may be gathered by coupling a plurality of intelligent electronic devices to the power bus. According to certain embodiments, measurements may be collected at different time instances. For example, the time instances may be based on a weather pattern in the consumption locality, different times of the day, or climatic conditions in the consumption locality. For example, some measurements may be collected in the daytime while others may be collected at night. In another example, some measurements may be collected during summer while others are collected during winter. Measurements may also be collected after a particular event (e.g. a blackout) has occurred.

Further, at step 304, a plurality of combination of model loads is generated. A contribution factor for each model load in each combination is also generated. The model loads can be mathematical representations of the electric loads as seen in the load model of FIG. 2. As explained above, electric loads are represented by a plurality of parameters. The model loads are generated by iteratively changing the plurality of parameters. Institutions such as Institute of Electrical and Electronics Engineers (IEEE) and Western Electricity Coordinating Council (WECC) have defined a plurality of model loads by following the process of iteratively changing some of the plurality of parameters. According to one embodiment, these model loads may be stored in a data repository. Examples of the data repository include, but are not limited to, dynamic libraries associated with modelling and analytics software such as Concorda Positive Sequence Load Flow (PSLF™) developed by General Electric Company and Power System Simulator (PSS™) suite developed by Siemens AG. The model loads are received from the data repository. A combination of model loads, which may be indicative of the real load that the electric network may be experiencing, includes a plurality of such model loads. Each model load has a contribution factor associated with it. The contribution factor for a model load in a combination defines the contribution of that model load to the combination.

At step 306, a match index for each combination for each measurement is generated. The match index for each combination for a particular measurement is generated by comparing a predicted output for each combination with an actual output of the electric loads for that particular measurement. The predicted output for each combination is generated by inputting values equivalent to the measurement in the mathematical representation of the combination. The mathematical representation in the load model, for a combination, includes the plurality of model loads from the combination, along with their parameters and the contributing factors. In an exemplary embodiment, when the measurements include a voltage provided by the power source, the load model illustrates a relationship between an output power at the electric loads and the voltage provided by the power source. The match index may be determined by comparing actual output power of the electric loads and a predicted output power obtained through the relationship, defined by the load model, between voltage input and the output power of the electric loads. In certain cases, the actual output may include a real component of power (P) as well as a reactive component of power (Q). In such a case the comparison between the actual output and the predicted output for each combination for a particular measurement may be computed using equation 1:

$$MI = \frac{\Delta P^2 + \Delta Q^2}{P^2 + Q^2} \tag{1}$$

where, MI is the match index for a combination for a particular measurement;

ΔP=P'−P where P' is the predicted real power obtained from the load model; and

ΔQ=Q'−Q where Q' is the predicted reactive power obtained from the load model.

According to some embodiments, a match index for a combination, using equation 1, may be computed for every measurement from the plurality of measurements. The contribution factor for each model load in each combination may be fixed at a prescribed value. In other embodiments, a match index is computed for every combination for each measurement by iteratively changing the contribution factor for each model load. The contribution factor for each model load in each combination is changed such that the difference between the actual output and the predicted output is reduced to a minimum value approaching zero. The match indices obtained may be saved in a data repository in the form of a table of each combination related entry. For every combination, the contribution factors that lead to a minimum match index are stored for determination of load models.

At step 308, a first likelihood index for each combination is computed. The first likelihood index is computed based on the match indices computed for each measurement for each combination. To compute the first likelihood index for a combination, all the match indices computed for the combination are considered. Further, equation 2 is used to compute the first likelihood index.

$$FLI = \frac{1}{MI_1} + \frac{1}{MI_2} + \ldots + \frac{1}{MI_n} \qquad (2)$$

where, FLI is the first likelihood index; and
$MI_1$, $MI_2$ ... $MI_n$ are the match indices for a combination for measurements 1, 2 ... n.

At step 310, a second likelihood index is computed for each contribution factor in each combination for every measurement. The second likelihood index is utilized to select a best contribution factor of motor loads for a combination. The first and second likelihood indices may be added to the table of combination in the data repository.

According to certain embodiments, the first and second likelihood indices are used to select a first set of combinations and corresponding contribution factors from the plurality of combinations to build the load model. The criteria for selection may be user dependent. For example, a user may select that combination for which the first likelihood index is lowest among all the first likelihood indices. Similarly, the user may select the contribution factors that have the lowest second likelihood index among all the second likelihood indices. Further, the user may select more than one combinations and contribution factors to develop a plurality of load models for the electric loads coupled to the power source.

Figure 6:
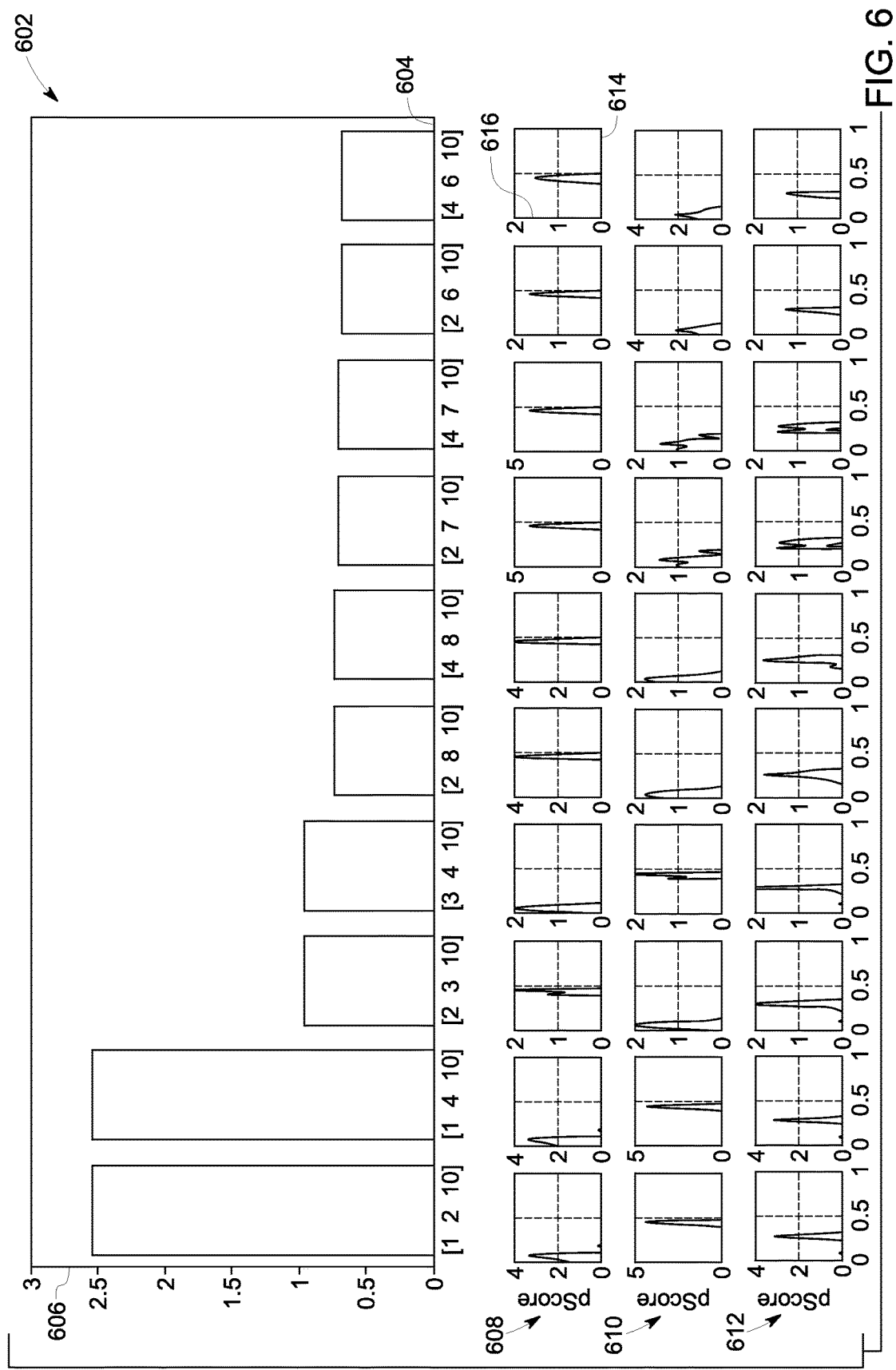
FIG. 6 illustrates test results highlighting likelihood indices for a plurality of combinations, according to embodiments of the present invention.

According to one embodiment, the method also includes generating a graphical illustration of the first likelihood index and the second likelihood index for each combination. The visual representation may include a histogram, a pie chart, and the like. An exemplary graphical illustration is shown in FIG. 6.

Figure 4:
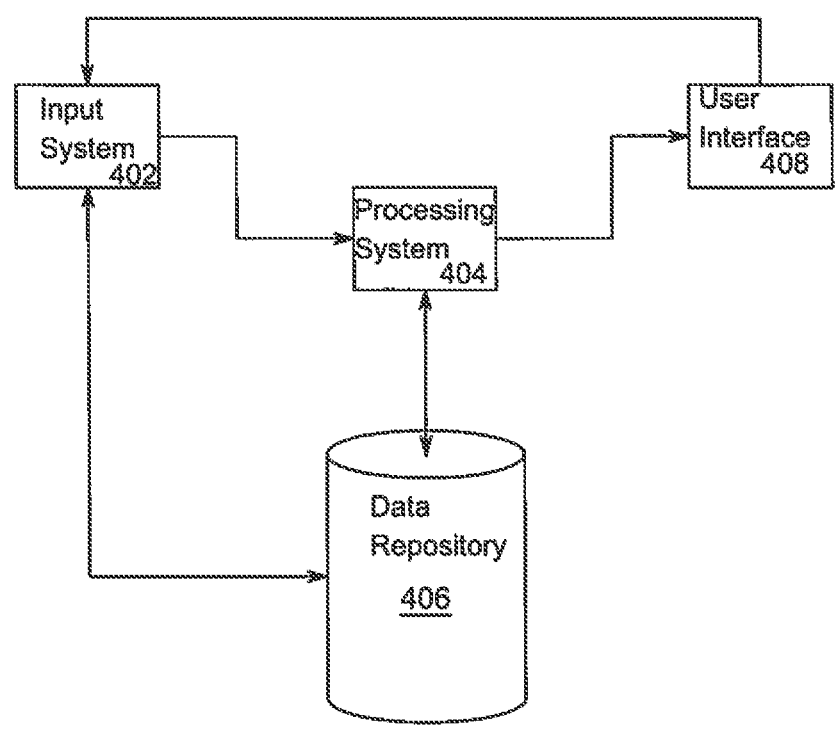
FIG. 4 illustrates a system for determination of load models, according to another embodiment of the present invention.

FIG. 4 illustrates a system for determination of load models, according to an embodiment of the present technique. The system 400 includes an input system 402, a processing system 404, a data repository 406, and a user interface 408.

The input system 402 is configured to receive a plurality of measurements that are representative of the input provided by the power source to the electric loads in the electric network. The input received may include voltage (V) across the power bus, current (I) flowing through the power bus, AC frequency (F), real power (P) provided by the power source, and reactive power (Q) provided by the power source. The measurements may be collected from the power bus that couples the power source to the electric loads at different time instances.

In one embodiment, a plurality of intelligent electronic devices (IEDs) may be utilized to collect the measurements. The input system 402 may be a software program that is configured to receive the input signals from the IEDs. The input system 402 and the IEDs may be coupled through a wired or a wireless communication channels. Further, the input system 402 may be configured to receive the plurality of measurements from a data repository, such as the data repository 406. The data repository 406 may be configured to store the measurements when the IEDs measure the input provided by the power source. The IEDs may be configured to collect the input data at different time instances. Time instances may be decided based on, at least one of, time of the day, weather conditions, climatic conditions, and the like.

In another embodiment, the input system 402 may receive data from a user interface, such as the user interface 408, which is configured to receive input data from a user. The user may measure input provided by the power source and enter the details through the user interface 408 to transmit the plurality of measurements to the input system 402.

Further, the processing system 404 in the system 400 is configured to receive the plurality of measurements from the input system 402. The processing system 404, in certain embodiments, may comprise a central processing unit (CPU) such as a microprocessor, or may comprise any suitable number of application specific integrated circuits (ASICs). The processing system 404 may include memory that can be an electronic, a magnetic, an optical, an electromagnetic, or an infrared system, apparatus, or device. Common forms of memory include CD-ROMs, hard disks, magnetic tape, flash memory, Random Access Memory (RAM), a Programmable Read Only Memory (PROM), and Electronically Erasable Programmable Read Only Memory (EEPROM), and a portable compact disc read-only memory (CDROM). The processing system 404 is capable of executing program instructions, such as generating control signals, and functioning in response to those instructions or other activities that may occur in the course of determining load models. Such program instructions typically comprise a listing of executable instructions for implementing logical functions. The listing can be embodied in any computer-readable medium for use by or in connection with a computer-based system that can retrieve, process, and execute the instructions. Alternatively, some or all of the processing may be performed remotely by additional processing systems. Furthermore, the processing system 404 can also receive user input instructions to perform certain functions or modify instructions.

The processing system 404 is also configured to generate a plurality of combinations of model loads. According to one embodiment, the processing system 404 may receive the combinations from a model load repository, such as the data repository 406. The data repository 406 may get model load data from data developed and shared by IEEE and WECC.

In certain embodiments, the processing system 404 is configured to filter the list of combinations of model loads. The combinations are filtered based on the parameters that define the model loads. For example, the list of combinations may include a combination that has model loads that replicate the behavior of lighting equipment, and household appliances. However, the actual electric loads in the network may include only heavy electric machinery. In such a case the processing system 404 may eliminate this combination from the list of combinations. The remaining combinations are then utilized for generating the load model.

The processing system 404 is further configured to compute a match index for each combination and each contribution factor. The match index is computed based on a comparison between an actual output of the electric loads and a predicted output of each combination. The predicted output is computed for each measurement from the plurality of measurements. The processing system 404, for a given combination, iteratively changes the contribution factor and computes the match index using equation 1 discussed above. The iterative changes in contribution factor effect a reduction in the difference between the actual output and the predicted output. The processing system 404, according to certain embodiments, is configured to determine contribution factors for each model load in each combination that lead to a minimum difference between the actual output and the predicted output for inputs represented by every measurement.

The processing system 404 is further configured to determine a first likelihood index for a combination. The first likelihood index is computed using the match indices computed for every combination for every measurement. According to one embodiment, the first likelihood index is computed using equation 2 discussed above. The first likelihood index is representative of a goodness of match of a particular combination for a load model. The processing system 404 is further configured to determine a second likelihood index for contribution factors of each model load for each combination. The second likelihood index is indicative of a goodness of match of a particular contribution factor for each model load for a combination.

According to certain embodiments, the first and second likelihood indices are displayed on the user interface 408 in the form of a graphical illustration. The graphical illustration may plot first likelihood indices of all combinations in a descending order. Further, for every combination, the second likelihood index for each contribution factor of each model load is plotted in a descending order. A user of the load model may choose the combinations and contribution factors based on a criterion around the first and second likelihood indices. The criterion may include choosing the combination and the contribution factors that have the highest likelihood indices.

In some embodiments, the user may choose a combination of model loads and a contribution factor for each model load in each combination based on the first and second likelihood indices displayed on the user interface 408 to simulate the operations of the electric network. The simulation may help the user to understand the effect of a certain climatic condition on the power consumption in the electric network. Simulations may also help in performing a causal analysis of a certain event (e.g. a blackout) in the network. The analyses results can significantly improve the ability of system operators and planners to operate/design the electric networks to avoid catastrophic events such as FIDVR (Fault Induced Delayed Voltage Recovery). Further, the simulation may also help operators in performing transmission contingency analysis and dynamic security assessments for the electric network under observation.

FIG. 5 illustrates an exemplary output of the method of determining load models according to an embodiment of the invention. Table 500 illustrates a plurality of iterative runs of combinations and contribution factors and the match index computed for each iterative run. Each row in the table 500 corresponds to a combination of model loads. The load model, as show in FIG. 2, includes four motor loads, one electronic load, and one static load. In the exemplary embodiment, a motor model load type from the plurality of motor model loads (e.g. motor model loads 210 in the model 200), the electronic load (e.g. electronic load 212 from the model 200), and the static load (e.g. static load 214 from the model 200) are assumed to be fixed. Columns 502, 504, and 506 show model load types for the remaining three motor loads in each combination. Further, columns 508, 510, 512, and 514 show contribution factors of all the four motor loads. Furthermore, columns 516, 518, 520, 522, and 524 show parameters for the static load in the load model. These parameters may also be changed to reduce the difference between the actual output and the predicted output. Column 526 shows the match index computed for each combination run. The exemplary data in FIG. 5 corresponds to one measurement related to input received by the electric loads from the power source. Multiple such tables may be generated for each measurement that is collected from the electric network.

In a run, for example run 528, motor load types 1, 2, and 3 are used to define the motor loads in the load model. In the run 528, the contribution factor for motor loads 1, 2, and 3 is fixed at 0.44($Fm_b$), 0.02($Fm_c$), and 0.14($Fm_d$) respectively. The contribution factor for the fixed type of motor load is set at 0.07($Fm_a$). The match index for run 528 is computed as 0.06704. Further, for the same measurement, in run 530 motor load types 1, 2, and 10 are used to define the motor loads in the load model. The contribution factor for each motor load is set at 0.05($Fm_a$), 0.45($Fm_b$), 0.30($Fm_c$), and 0.07($Fm_d$). The match index for run 530 is computed to be 0.00004.

During operation, tables such as table 500 are generated for every measurement that is received from the electric network. Further, multiple runs for each combination, where multiple iterative changes are made to the contribution factors of the model loads for each combination, are carried out. Match indices are computed for each run for each combination for the plurality of measurements is used to determine the first and second likelihood indices. A visual representation of the first and second likelihood indices may be prepared and displayed to the user for selecting the set of combinations that may be utilized in the load model.

FIG. 6 illustrates a visual representation of the first and second likelihood indices of each combination, according to an embodiment of the invention. The first and second likelihood indices are computed from match indices of each combination for a plurality of measurements. The first and second likelihood indices may be plotted in the form of a histogram. In FIG. 6, chart 602 shows a plot of the first likelihood index for a plurality of combinations. The combinations are named on X-axis 604 of the histogram and a magnitude of their first likelihood index is plotted along the y-axis 606. In the chart 602, combination with motor load types 1, 2, and 10 has a first likelihood index of 2.5, whereas combination with motor load types 2, 3, and 10 has a first likelihood index of ~1. A user may select the combination for the load model based on the histogram. For example, a user may select the combination with the highest first likelihood index.

FIG. 6 also shows charts 608, 610, and 612 that represent the second likelihood index for contribution factors of each model load type in each combination. In the figure, chart 608 for combination [1,2,10] refers to the second likelihood indices for model load type 1, whereas 610 refers to the second likelihood indices for model load type 2, and 612 refers to the second likelihood indices for model load type 10. The charts 608, 610, and 612 plot the contribution factor on the X-axis 614, and the second likelihood index (pScore) for each contribution factor on the Y-axis 616. A user may choose that contribution factor for a particular model load type that has the maximum second likelihood index value. For example, for combination [1,2,10] the user may select the contribution factor for model load type-1 as 0.05, for model load type-2 as 0.45, and model load type-10 as 0.3.

Post selection of the combination and the contribution factors for model loads in the combination, the processing system 404 may be configured to generate output, for a particular input received from the power source, of the load model using mathematical equations that define the load model.

Various embodiments described above thus provide for a method and a system for determination of load models. The above-described embodiments of the system and method provide a dynamic and probabilistic determination of model load combinations for the load model. The user is provided with a visual representation of likelihood of all combinations and the contribution factors in each of these combinations. This information can be used by the users to select more than one combination for use with the load model. Further, the system and method also provides for results for multiple contribution factors for each combination. This may be used for further testing of load models.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, the term "processing system" refers to software, hardware, or firmware, or any combination of these, or any system, process, or functionality that performs or facilitates the processes described herein.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for determination of load models, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A method for generating electric load models, the method comprising:
   receiving a plurality of measurements representative of input provided by at least one power source to a plurality of electric loads at different time instances;
   generating a plurality of combination of model loads and assigning a contribution factor to each model load in each combination;
   computing a match index for each combination of model loads for each measurement by comparing a predicted output of each combination with an actual output generated by the plurality of electric loads for each input represented by each measurement, wherein the predicted output for each combination is generated by providing input equivalent to each measurement;
   computing a first likelihood index for each combination based on the match index for each model load for the plurality of measurements; and
   computing a second likelihood index for each contribution factor in each combination based on the match index for each combination for the plurality of measurements.

2. The method of claim 1, wherein a first set of combinations is selected based on a set of user defined criteria pertaining to the first likelihood index and the second likelihood index.

3. The method of claim 1, further comprising generating a graphical illustration of the first likelihood index and the second likelihood index for each combination.

4. The method of claim 1, further comprising iteratively changing the contribution factor assigned to each model load in each combination till a difference between the predicted output for the combination and the actual output is minimum.

5. A system for generation of electric load models, comprising:
   at least one input system configured to receive a plurality of measurements that are representative of input provided by a power source to a plurality of electrical loads at different time instances, wherein the measurements are collected from a power bus that couples the power source with the plurality of electrical loads;
   a processing system configured to:

generate a plurality of combination of model loads and assigning a contribution factor to each model load in each combination;

compute a match index for each combination for each measurement by comparing a predicted output of each combination with an actual output generated by the plurality of electric loads for each input represented by each measurement, wherein the predicted output for each combination is generated by providing input equivalent to each measurement;

compute a first likelihood index for each combination based on the match index for each combination for the plurality of measurements; and compute a second likelihood index for each contribution factor in each combination based on the match index for each combination for the plurality of measurements.

6. The system of claim 5, wherein the processing system is further configured to iteratively change the contribution factor assigned to each model load in each combination till a difference between the predicted output for the combination and the actual output is minimum.

7. The system of claim 5, further comprising a data repository configured to store a plurality of model load types.

8. The system of claim 7, wherein the data repository is coupled with the input system and is configured to store information pertaining to inputs provided by the power source to the electric load at different time instances.

9. The system of claim 5, wherein the processing system is further configured to select the first set of combinations based on the first likelihood index and the second likelihood index.

10. The system of claim 5, further comprising a user interface configured to display a graphical illustration of the first likelihood index and the second likelihood index for each combination.

11. The system of claim 5, further comprising a plurality of intelligent electronic devices (IEDs) coupled to the input system, wherein the plurality of IEDs are connected to the power bus and are configured to generate the plurality of measurements.

* * * * *